United States Patent [15] 3,648,134

Audeh et al. [45] Mar. 7, 1972

[54] REEL SERVOSYSTEM

[72] Inventors: Azmi S. Audeh, Camarillo; Anil N. Deodhar, West Los Angeles; Henry G. Glattfelder, Los Angeles, all of Calif.

[73] Assignee: Ampex Corporation, Redwood City, Calif.

[22] Filed: Nov. 17, 1969

[21] Appl. No.: 877,278

[52] U.S. Cl. .......... 318/6
[51] Int. Cl. .......... B65h 59/38
[58] Field of Search .......... 318/6, 7

[56] References Cited

UNITED STATES PATENTS

| | | | |
|---|---|---|---|
| 3,525,481 | 8/1970 | Longland | 318/6 X |
| 3,370,802 | 2/1968 | Wooldridge et al. | 318/7 X |
| 3,400,895 | 9/1968 | Cole et al. | 318/7 X |

*Primary Examiner*—Bernard A. Gilheany
*Assistant Examiner*—W. E. Duncanson, Jr.
*Attorney*—Robert G. Clay

[57] ABSTRACT

A reel servosystem for a digital magnetic tape transport responds to tape loop length signals from two spaced-apart linear sensors in a vacuum chamber and digital signals representing tape direction on either side of the tape loop formed by the chamber to control a reel motor independent of a capstan motor. The digital signals and sensor signals are combined in a logic network to introduce selective reel drive braking when the tape loop is somewhere between the sensors and the reel drive is moving opposite the capstan drive. The linear sensors otherwise generate analog signals to control loop length in proportional fashion, to maintain the loop at selected reference positions within the vacuum chamber dependent on direction.

15 Claims, 2 Drawing Figures

INVENTORS
AZMI S. AUDEH
ANIL N. DEODHAR
HENRY G. GLATTFELDER

BY Robert G. Clay
ATTORNEY

INVENTORS
AZMI S. AUDEH
ANIL N. DEODHAR
HENRY G. GLATTFELDER
BY
Robert G. Clay
ATTORNEY

REEL SERVOSYSTEM

BACKGROUND OF THE INVENTION

1. Field of the Invention

This invention relates to digital magnetic tape transports and particularly to reel servocontrols for such transports and other systems using tape loop forming buffer devices such as vacuum chambers.

Digital tape transports move a magnetic tape intermittently and bidirectionally past a read-write head so that data may be read from or written on the tape. A high-speed intermittent drive system, usually of the single or dual capstan type, imparts the desired motion to the tape in the vicinity of the heads. However, the tape reels and reel motors have substantially larger inertia and it is impractical to require that they follow the rapid reversals, accelerations and decelerations of the tape drive. For this reason a buffer, usually a tape storage arm or vacuum chamber, is placed between the capstan and each reel. Thus, when a sudden reversal by the capstan causes it to draw or supply tape faster than a reel can unwind or wind, the excess tape can be supplied or stored by the buffer device and the slower acting reel can be controlled with a degree of independence of the tape drive.

This invention provides an improved system for controlling the operation of a reel motor so as to maintain control of the position of a variable length buffer loop in such a system or in related applications.

2. Description of the Prior Art

In one typical technique for controlling a reel motor, the tape loop is caused to oscillate about one or the other of a pair of sensors depending upon the direction of tape motion. In this so-called bang-bang mode of operation, an optimum position is sought to be maintained for protection against sudden reversal of direction. Generally, the reel motor is being constantly accelerated at a maximum rate in one direction or the other, and a large, high-power motor is needed for the necessary speed of response. The results are expressed in terms of high duty cycles with consequent temperature buildup, motors of excessive size and cost, or a combination of these.

A different technique of controlling a reel motor is to cover substantially the entire length of a tape storage chamber with a single linear photoelectric sensor for generating an analog tape loop position signal. Reference voltages may be established to indicate desired loop lengths, and a servosystem then operates to generate an error signal from the difference between the actual position signal from the linear sensor and the desired reference voltage. Establishing linearity is however very difficult, and using an extremely long sensor of adequate linearity, sensitivity and freedom from noise is generally excessively expensive and impractical. In addition a decrease in sensor sensitivity with aging can result in loss of tape loop control.

SUMMARY OF THE INVENTION

In accordance with the invention, a loop length control system for a digital magnetic tape transport or other system using a variable length buffer mechanism incorporates a combination of analog and digital circuits. Relatively short length, spaced-apart analog position sensors are used in conjunction with signals representative of tape direction at opposite ends of the variable loop device, for maintaining the loop at either one of the analog sensors, depending upon direction of motion, and for generating control signals for selectively braking the high-inertia drive, such as a reel drive motor, when the loop length is between the sensors. The arrangement permits intermittent, bidirectional operation of the tape, but also maintains precise and stable control of the variable loop length device with minimum power drain, and with inexpensive sensor elements.

In one example of a digital magnetic tape transport reel servo in accordance with the invention, two relatively short solar cell sensors are disposed at spaced-apart locations along a vacuum chamber. A linear power amplifier is coupled to drive the reel motor, and the reel direction is sensed, as by generating a signal representative of the back EMF of the motor. The tape drive direction is also established and these signals are combined in a logical decision network using digital circuits, to indicate the relative disparity between the reel drive direction and the capstan direction when the tape loop is between the spaced-apart sensors. When the loop is in this zone, the servo is arranged to apply a braking signal to the reel motor only when the reel drive and the tape drive are oppositely acting, thus tending to bring the reel drive to a stop with the loop somewhere in the zone between the sensors. Observation of this criterion is sufficient to account for the time constant of the slower acting reel motor, by virtue of the selected relationship between the positions of the sensors and the associated length of the vacuum chamber available for storage. Further, the arrangement is such that, whether or not braking is applied when the loop is between the sensors, the tape drive automatically moves the loop toward the proper sensor for maintaining optimum position of the tape loop for a given direction of tape movement, thus assuring that maximum usage is made of the storage capacity of the buffer chamber. When the tape drive operates intermittently or continuously in one direction of movement, the analog sensor utilized for that particular direction generates a linear signal that adequately provides the desired precise and stable control of loop length.

BRIEF DESCRIPTION OF THE DRAWINGS

A better understanding of the invention may be had by reference to the following descriptions, taken in conjunction with the accompanying drawings, in which.

DETAILED DESCRIPTION OF THE INVENTION

Figure 1:
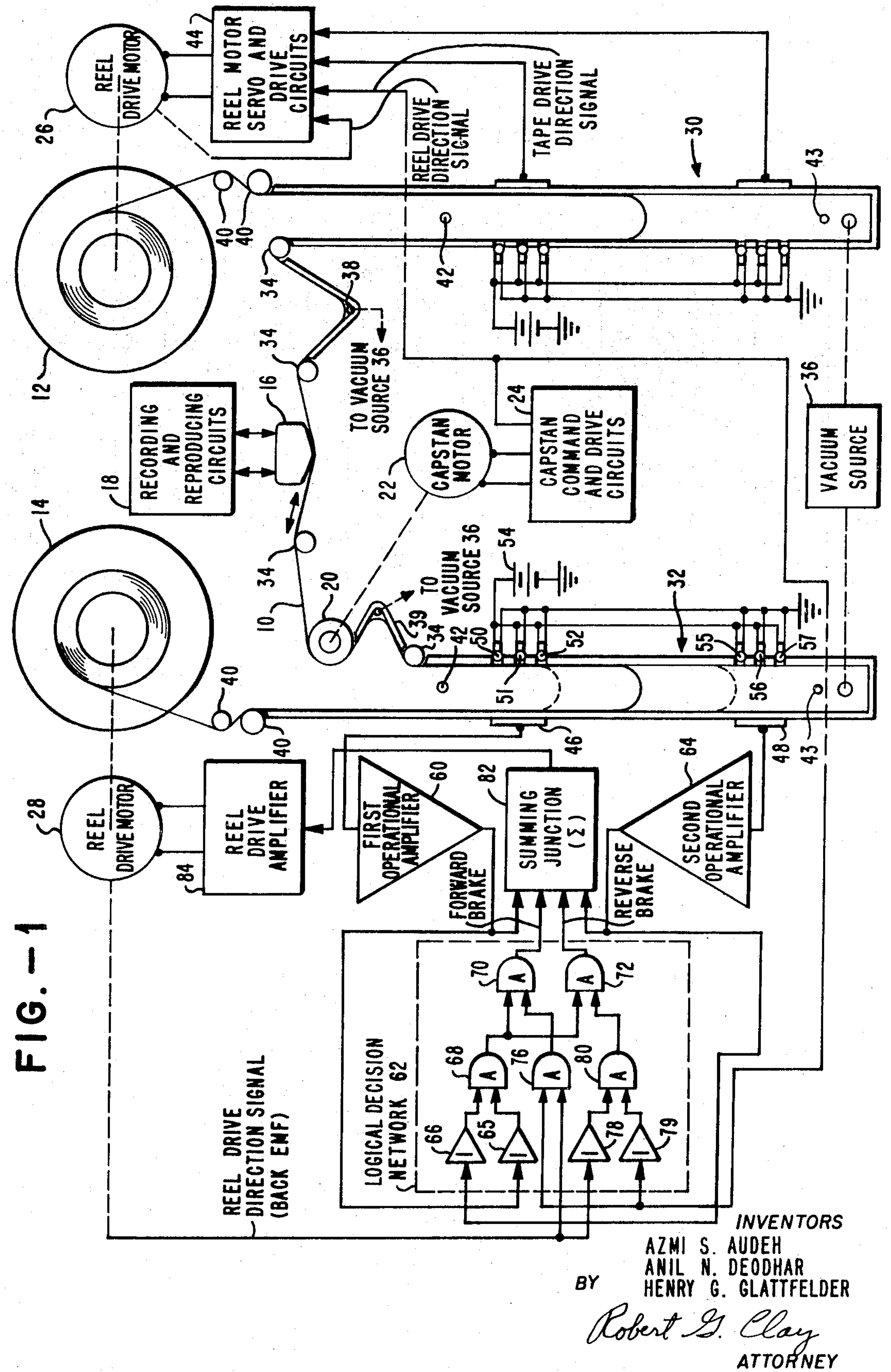
FIG. 1 is a combined simplified elevational view and block diagram of a digital magnetic tape transport system employing a reel servo arrangement according to the invention; and, FIG. 2 is a block diagram of a different arrangement of a portion of a reel servo that may be used in the system of FIG. 1.

Although the invention is applicable to use in a number of different contexts, it is described in conjunction with digital magnetic tape transports, inasmuch as these provide extremely exacting demands upon variable loop length control systems. In the digital magnetic tape transport illustrated in FIG. 1, a magnetic tape 10 is passed between a supply reel 12 and a takeup reel 14 across a magnetic head 16, coupled to recording and reproducing circuits 18. A digital control system for actuating the recording and reproducing circuits 18 is not shown for brevity, but may be assumed to be any conventional system utilized in the art.

The tape is driven in bidirectional, intermittent motion by a capstan 20, the single capstan 20 here being illustrative of one of the many different types of tape drive systems that may be utilized including pinch roller, vacuum and pneumatic mechanisms of the single capstan or dual capstan types. The present example is illustrative of a widely used class of magnetic tape transports in which the single capstan 20 is driven directly by a high torque-to-inertia ratio capstan motor 22. The acceleration and deceleration of the capstan motor 22 are electronically controlled by drive techniques now well known in the art, but here categorized as capstan command and drive circuits 24. In typical operation of digital magnetic tape transports, a data-processing system provides command signals, such as forward and reverse commands, and the command and drive circuits generate acceleration, deceleration and continuous run commands for accelerating the tape 10 to speed within a relatively few milliseconds in a selected direction, or decelerating in comparable time intervals.

The supply and takeup reels 12, 14 are driven by reel drive motors 26, 28, respectively, the masses and inertias involved being substantially greater than the comparable factors for the capstan drive system. In the present example of a practical system, approximately 100 milliseconds are required for the reel drive system to bring the reel up to capstan speed, in contrast to the few milliseconds required for the capstan drive. On the other hand, the top speed of the reel drive is substantially higher than that of the capstan speed (which may, for example, be approximately 150 ips), in order that the reel drive can overtake the capstan drive and buffer loops in the tape can be stabilized relative to a selected loop sensor.

A pair of vacuum chambers 30, 32 are employed for buffering between the fast acting capstan system and the relatively slower acting reel drive systems, the right-hand vacuum chamber 30 (as viewed in the drawing) being disposed between the capstan 20 and the supply reel 12, and the left-hand vacuum chamber 32 being between the capstan 20 and the takeup reel 14. Low-inertia, low-friction guides 34, typically air bearing guides, are disposed along the tape path between the vacuum chambers 30, 32, and the desired pressure differentials across the tape loops within the chambers 30, 32 are established by a vacuum source 36 coupled to outlets at the bottom ends of the chambers 30, 32. Small buffer pockets 38, 39 are disposed on opposite sides of the capstan 20 for buffering tape transients induced by the sudden accelerations and decelerations, small outlets in the bottoms of these buffer pockets 38, 39 being coupled to the vacuum source 36.

A pair of guides 40 are disposed between each reel 12, 14 and the adjacent vacuum chamber 30, 32 respectively for guiding the tape between the chamber and the associated tape pack on the reel. Within each vacuum chamber a short loop detector 42 is disposed approximate the upper end of the chamber 30 or 32, to detect the condition in which the tape loop becomes excessively short due to failure of a component or some extraneous influence on the tape, which might result in loss of the loop from within the chamber and consequent damage. Similarly a long loop detector 43 is disposed approximate the lower end of each chamber 30, 32, to detect the condition in which the tape loop becomes excessively long.

The majority of the elements heretofore discussed are conventional in systems of this type, and it will be recognized that a variety of guiding, driving and vacuum chamber arrangements may be utilized.

In accordance with the invention, however, like systems are utilized for sensing loop length within the chambers 30, 32, and controlling the respective reel drive motors 26, 28 so as to maintain full control of the loop length while providing the appropriate buffering action between the tape drive and the reels. Like arrangements of light sources and photosensors are used between the right-hand and left-hand vacuum chambers 30, 32 and only the system incorporated in conjunction with the left-hand vacuum chamber 32 will be described in detail. The circuits responsive to the loop length signals from the right-hand chamber 30 have been designated as the reel motor servo and drive circuits 44 coupled to the reel drive motor 26, and the following description as to the reel servo for the takeup reel system should be understood as applicable to the supply reel system as well.

In the left-hand vacuum chamber 32, a pair of spaced-apart photosensors 46, 48, hereafter referred to as the upper and lower sensors respectively, are disposed at selected spaced-apart regions along the length of the vacuum chamber. A predetermined length relationship is used in this respect, to establish a given proportionality between the various zones of the vacuum chamber. The upper zone, that is the zone above the lower edge of the photosensor 46, may be taken to have a length of unity. This length is adequate to provide storage of tape sufficient to enable the reel drive motor 28 to overtake the capstan drive system, starting with the reel drive motor 28 at zero velocity. The distance from the upper edge of the lower sensor 48 to the effective bottom of the chamber then is also unity, for the same purpose. The distance in the zone between the two sensors, which may be referred to as the dead zone in that no proportional varying signal is derived from the sensors 46, 48, is then taken as three times unity, to permit the tape loop to remain in this zone as the reel drive is decelerated to rest in response to a reversal in the direction of the capstan tape drive.

Oppositely disposed within the vacuum chamber wall on the opposite side from the upper sensor 46 is one or more radiation devices, such as a grouping of three light bulbs 50, 51, 52 disposed in apertures in the side of the wall, and each energized from a suitable source, here shown as a DC source 54. The use of an array of bulbs ensures more uniform dispersion of the light falling on the oppositely disposed sensor, although more or fewer light sources may be utilized, and they may be disposed in the back or even front walls of the chamber, as long as light is incident therefrom on the sensor. The sensor itself is preferably a silicon solar cell, because of the relatively low cost and reliability of such units and the amplitude of the signals which they generate. A separate array of light bulbs 55, 56, 57 is disposed in the wall of the vacuum chamber 32 opposite the lower sensor 48.

Signals from the upper sensor 46 are amplified by a first operational amplifier 60 prior to being applied to a logical decision network 62. A second operational amplifier 64 receives signals from the lower sensor 48 for amplification prior to their application to the logical decision network 62. The term "logical decision network" refers generally to a digital type of gating system arranged in now conventional fashion, to respond to predetermined input patterns by providing selected output signal patterns. The decision network thus is a typical "AND" and "OR" gate configuration, with inverter circuits being utilized as appropriate, and with pulse shapers, isolation circuits and amplifiers being omitted for simplicity. Because the arrangement and the functioning of such networks are well known, only the principle elements are described hereafter, it being understood that these elements may be arranged as integrated circuits, transistor and diode circuit combinations or even relay trees (where the speed of response can be tolerated). The logical decision network 62 also receives a reel drive direction signal from the reel drive motor 28, the direction signal here being indicated by a back EMF signal, although the same signal may be generated in a number of different ways, including a tachometer mounted on the reel drive system or a tachometer mounted in the tape path. The logical decision network 62 also receives a tape drive direction signal. The tape drive direction signal may be generated from the command signal for the capstan motor 22, from the energizing circuits, from a tachometer commonly used in such capstan drive systems, or from some other available source.

In the logical decision network 62, the signals from the first and second operational amplifiers 60, 64 are applied to a pair of inverters 65, 66, the output of each of which activates a different input of an AND-gate 68. The sensors 46, 48 are arranged such that they provide substantially zero volts output when the tape loop is in the dead zone between them. These outputs are here taken as the "false" state, so that when the tape loop is in the dead zone, the outputs from both of the inverters 65, 66 are "true," and the output from the AND-gate 68 is also "true," such that this output signal represents a dead zone indication, and is used to prime a different pair of AND-gates 70, 72 which provide output signals from the logical decision network. The remaining input of one of these AND-gates 70 is activated from the output of a different AND-gate 76, which is activated fully when both of its inputs, representing the reel drive direction signal and the tape drive direction signal are "true." For purposes of reference, the forward direction of the tape drive (counterclockwise rotation of the capstan 20 as seen in the drawing) will be assumed to represent the "true" state, whereas the reverse direction of the reel drive (counterclockwise rotation) will be assumed to represent the "true" state. Thus, when the tape drive and the reel drive are forward and reverse, respectively, the AND-gate 76 is activated, providing an output signal from the AND-gate 70 to brake the reversely rotating reel. This output signal may therefore be referred to as a forward brake signal. The same drive signals, applied through inverters 78, 79, activate an AND-gate 80 when the opposite condition is true, that is, the tape drive is operating in the reverse direction and the reel drive is operating in the forward direction. With the tape in the dead zone and these conditions true, the output AND-gate 72 is thereby activated to provide a reverse brake signal as the output from the logical decision network 62. The two outputs from the logical decision network 62 and the outputs from the first and second operational amplifiers 60, 64 are applied to a summing junction 82, which may be arranged to provide needed isolation between the various elements, and the output signal from which is applied to a reel drive amplifier 84 for energizing the reel drive motor 28.

In operation, therefore, the reel servosystem exemplified in FIG. 1 provides a hybrid control employing both analog and digital elements. Furthermore, the tape loops are automatically maintained in balance, for the forward and reverse directions of tape drive by the capstan 20, at the long loop and short loop positions, respectively (forward direction for the tape being that direction at which the capstan 20 is withdrawing tape from the chamber 30).

When the tape loop is at or below the lower limit of the upper sensor 46, the first operational amplifier 60 provides an output signal of zero volts. This output signal increases linearly as the tape loop moves upward along the length of the sensor 46 to a maximum of approximately −12 volts at the upper limit of the sensor. The loop tends to stabilize at a position varying only slightly from the zero-volt position. This position may vary slightly depending on the tape pack of the reel 14. If the tape shortens to the extent that the loop is above the upper limit of the upper sensor 46, the first operational amplifier 60 simply provides the maximum amplitude (−12 volt) signal until the tape loop again comes down into the region of the sensor 46. As previously stated, the unity length of the tape chamber from the lower edge of the sensor 46 to the short loop sensor 42 is selected such that the reel drive motor 28 can, starting from no worse than a stopped condition, overtake the capstan drive before the short loop condition occurs.

Similarly, for the reverse direction of motion, the tape loop seeks to stabilize at the upper edge of the lower sensor 48, the second operational amplifier 64 controlling the reel servo with a linear signal in its range. This linear signal varies from zero to +12 volts in this instance, and the selected unity length of vacuum chamber again exists. It should be noted, however, that the upper sensor 46 approximates zero voltage when it is fully covered, whereas the lower sensor 48 approximates zero voltage when it is substantially fully uncovered. This relationship contributes to the simplicity of the system and, together with the differences in polarity of the signals generated in the linear range by the first and second operational amplifier 60, 64, ensures freedom from ambiguity as to position.

When the tape loop is in the dead zone range, neither operational amplifier 60, 64 generates a significant voltage. The dead zone signal is generated to prime the output AND-gates 70, 72, and the logical decision network 62 then functions so as to apply braking as needed to bring the reel drive motor 28 to a stop with the tape loop within the dead zone. No other control function on the reel drive motor 28 is provided with the tape loop in the dead zone. With the tape drive running forward, that is, taking tape out of the chamber 30, no action is required if the reel drive motor 28 is also moving the tape forward. Note that at this time the reel drive motor 28 is not energized by a drive signal, but would simply be coasting either in the forward or reverse direction. If the reel drive motor 28 is coasting so as to drive the tape forward, the lower sensor system is of adequate length to bring the tape loop under control by using the linearly varying position signal. If the reel drive motor 28 is running in the reverse direction, however, then both input states are "true" at the AND-gate 76 within the logical decision network 62. The AND-gate 70 is thus fully energized, and provides a forward energization signal of −12 volts to act as a braking energization on the reel drive motor 28 and bring the reel drive motor 28 to a stop. The signal terminates, and energization of the motor also stops, when the reel drive direction signal goes to zero. When the opposite condition exists, that is when the tape drive operates in reverse and the reel drive operates in the forward direction, the tape loop may tend to shorten rapidly within the vacuum chamber 32. In this condition, the reverse brake signal is generated at the output of the AND-gate 72 to provide a full amplitude (+12 volt) braking signal so as to again bring the reel drive to a stop with the tape loop within the dead zone. Again, any further shortening of the tape beyond this position can adequately be handled by the linearly varying control signal derived from the upper sensor 46 and the first operational amplifier 60.

Arrangements in accordance with the invention provide stable and precise control of tape loop position, even though relatively small motors may be used, and relatively little power is required. With the tape in a stable position, only the energization needed to overcome friction and windage losses and the like is needed at the reel drive. If an arbitrary sequence of commands is applied such that the tape loop enters the dead zone, the reel drive is not energized but is permitted to coast, except when braking energization is applied in opposition to the coasting action. The result is that a relatively small reel motor can be constantly operated in this reel servosystem with a rise in temperature of only a few degrees centigrade above ambient, whereas many existing systems are substantially fully energized constantly and are subjected to substantial heating problems.

Because of the coasting relationship employed in the dead zone, the system automatically positions the loop at the proper short loop or long loop position, depending upon the direction of tape motion. If the capstan 20 is running forward, the tape loop in the dead zone coasts downwardly to the stable position in relation to the lower sensor 48, which provides a maximum length of vacuum chamber 32 to permit reversal of the tape direction. Conversely, if the tape drive is running in reverse and pulling tape out of the chamber, the tape loop coasts upwardly to its stable position relative to the upper sensor 46, providing optimum use of the chamber in this instance as well.

Figure 2:
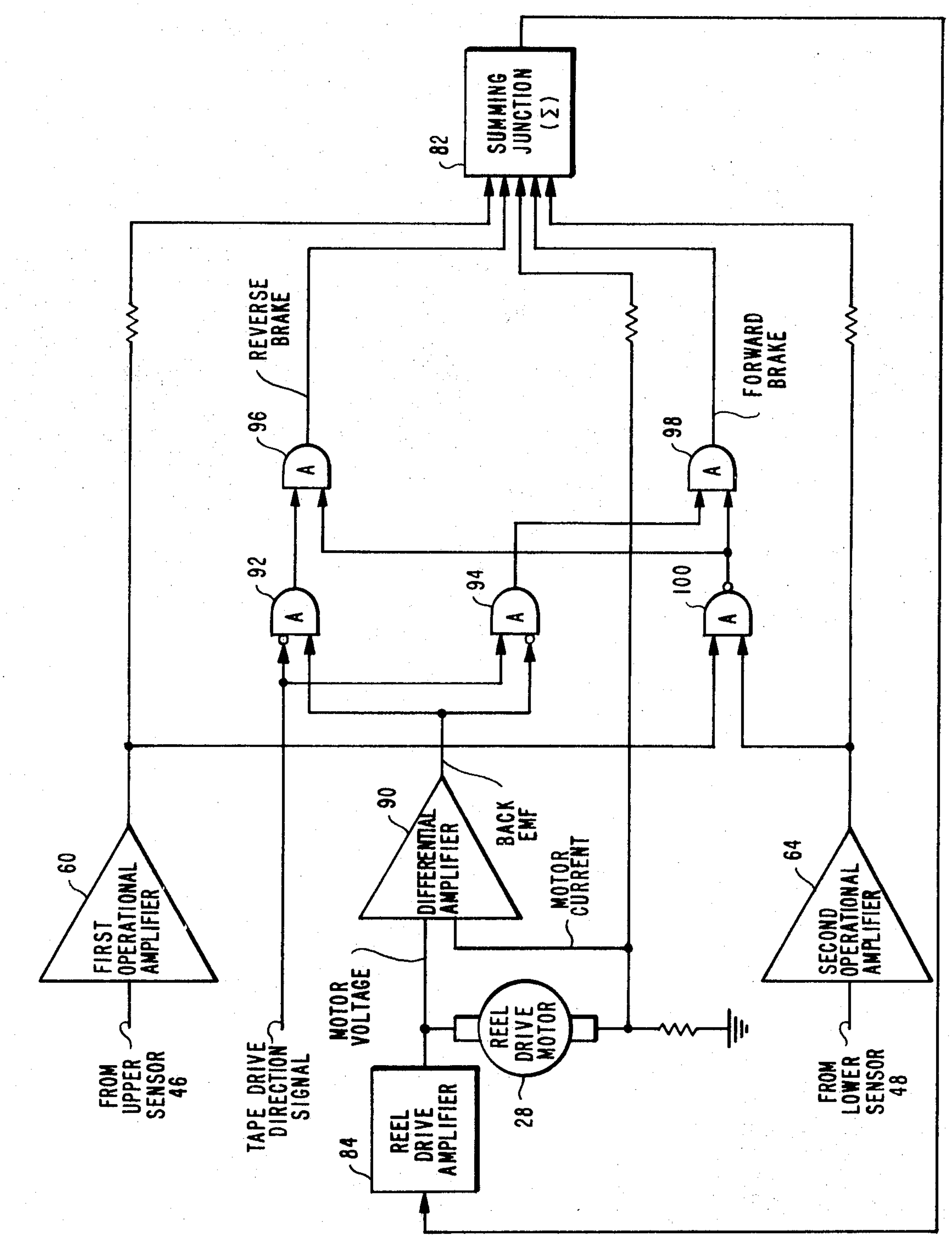

A different arrangement of a reel servo according to the invention is partially shown in FIG. 2 in which those elements corresponding to like elements in FIG. 1 are identified by the same reference numerals. Again, the upper and lower sensors 46, 48 are employed to generate amplified signals via the first and second operational amplifiers 60, 64 in the manner previously described. The reel drive motor 28 which is shown in greater detail in FIG. 2 is coupled to the output of the reel drive amplifier 84 with the input of the amplifier 84 being coupled to the output of the summing junction 82.

In the FIG. 2 arrangement, the reel drive direction signal comprises the back electromotive force (EMF) of the reel drive motor 28. The back EMF which is provided by subtracting motor current from motor voltage in a differential amplifier 90 is applied to one input of each of a pair of AND-gates 92, 94. The second input of each AND-gate 92, 94 is coupled to receive the tape drive direction signal. The AND-gates 92, 94 are so constructed that the back EMF of the reel drive motor 28 will enable the associated input of the AND-gate 92 if the reel 14 is moving in the forward direction and will enable the associated input of the AND-gate 94 if the reel 14 is moving in the reverse direction. Similarly, the tape drive direction signal enables the associated input of the AND-gate 92 if the tape is being driven in the reverse direction and enables the associated input of the AND-gate 94 if the tape is being driven in the forward direction.

Thus, if the reel is running forward while the tape is being driven in reverse, both inputs of the AND-gate 92 are enabled and a signal is provided to enable one of the inputs of an AND-gate 96. Similarly, if the reel is running in reverse while the tape is being driven forward, both inputs of the AND-gate 94 are enabled and a signal is provided to enable one of the inputs of an AND-gate 98. If the reel and tape drive are running in the same direction, either forward or reverse, neither of the AND-gates 92, 94 is activated.

The output of the first operational amplifier 60 is coupled to the summing junction 82 and to one of the inputs of a NAND-gate 100. The output of the second operational amplifier 64 is coupled to the summing junction 82 and to the other input of the NAND-gate 100. When the tape loop is at or above the upper sensor 46, the resultant signal from the upper sensor 46 is amplified by the first operational amplifier 60 and passed to the reel drive amplifier 84 via the summing junction 82 to drive the reel drive motor 28 in the same manner as in the FIG. 1 arrangement. Signals from the lower sensor 48 are likewise amplified by the second operational amplifier 64 before being passed via the summing junction 82 to the reel drive amplifier 84 to drive the reel drive motor 28 when the tape loop is at or below the lower sensor 48. However, when the tape loop is in the dead zone between the sensors 46, 48 so as to provide the absence of signals at the outputs of both operational amplifiers 60, 64, both inputs of the NAND-gate 100 are enabled and signals are passed to enable the second inputs of the AND-gates 96, 98. When this condition occurs, both inputs of the AND-gate 96 are enabled if the reel is moving forward and the tape drive is in reverse, and the AND-gate 96 applies a reverse brake signal to the reel drive amplifier 84 via the summing junction 82. If the reel is moving in the reverse direction and and tape drive is in the forward direction, both inputs of the AND-gate 98 are enabled to provide a forward brake signal to the reel drive amplifier 84 via the summing junction 82. If the reel and tape drive are both running in the same direction, neither of the AND-gates 92, 94 is activated, as previously described, and the reel continues to coast uninterrupted by any braking energization.

High-efficiency performance is generally realized if the drive current for the reel drive motor 28 is limited to some predetermined maximum value. This is accomplished in the arrangement of FIG. 2 by coupling the current line from the reel drive motor 28 to the summing junction 82 to provide a current sense line. Current in the sense line combines in the summing junction 82 with the motor drive current applied to any other summing junction 82 input to clamp or limit the total drive current to the predetermined maximum value.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A reel servosystem for controlling the length of a tape loop in a tape storage chamber for a bidirectional digital magnetic tape transport by controlling a reel motor independent of tape driving, comprising:

first and second spaced-apart sensor means, each of the sensor means being associated with the tape storage chamber and responsive to the location of the tape loop adjacent thereto to generate a signal representing the particular location of the tape loop along the length of the sensor, the signal generated by each of the sensor means being applied to drive the reel motor; and digital means responsive to the first and second sensor means and to tape direction on opposite sides of the tape loop for selectively applying braking energization to the reel motor whenever the tape loop is located between the first and second sensor means and the tape is moving in opposite directions on the opposite sides of the tape loop.

2. In a digital tape transport having at least one tape reel, at least one capstan driving means, and at least one tape storage chamber located so as to receive a portion of a magnetic tape extending between the reel and the capstan driving means and form a loop in the tape, a servosystem for controlling the operation of the reel to in turn control the length of the tape loop within the storage chamber comprising:

first sensor means located at a long loop position within the storage chamber and responsive to the tape loop to generate a signal representing the particular location of the tape loop along the length of the sensor whenever the tape loop is at least long enough to reside in the vicinity of the first sensor means, the generated signal being applied to drive the reel in a first direction;

second sensor means located at a short loop position within the storage chamber and responsive to the tape loop to generate a signal representing the particular location of the tape loop along the length of the sensor whenever the tape loop is at least short enough to reside in the vicinity of the second sensor means, the generated signal being applied to drive the reel in a second direction opposite the first direction; and means responsive to the absence of the generated signal from the first and second sensor means signals to the relative directions of movement of the tape on the opposite sides of the storage chamber for selectively decelerating the reel.

3. A servosystem in accordance with claim 2, wherein the first and second sensor means are spaced apart by a sufficient distance to permit a tape loop initially residing between the first and second sensors to remain between the first and second sensor means as the reel is decelerated to rest in response to a reversal in the direction of tape movement at the capstan driving means, and the first and second sensor means are spaced from adjacent ones of opposite ends of the storage chamber by sufficient distances to allow the tape loop to remain within the storage chamber as the reel is accelerated from rest to operating speed in either of the first and second directions.

4. A servosystem in accordance with claim 3, wherein the distance between the first sensor means and the adjacent end of the storage chamber is substantially equal to the distance between the second sensor means and the end of the storage chamber adjacent thereto and is substantially equal to one-third the distance between the first and second sensor means.

5. For use in a magnetic tape transport in which a tape extends from a reel to tape driving means via tape storage chamber means, the storage chamber means comprising an elongated structure having an open first end through which the tape extends to form a loop in the tape, a second end opposite the first end, a short loop position adjacent the first end, and a long loop position adjacent the second end, a servosystem for the reel comprising:

means responsive to the position of the tape loop within the storage chamber means for driving the reel in a first direction with an energization dependent upon the deviation of the tape loop from the short loop position whenever the tape loop lies between the short loop position and the first end of the storage chamber means;

means responsive to the position of the tape loop within the storage chamber means for driving the reel in a second direction opposite the first direction with an energization dependent upon the deviation of the tape loop from the long loop position whenever the tape loop lies between the long loop position and the second end of the storage chamber means; and means responsive to the position of the tape loop within the storage chamber means and to the direction of movement of the tape on opposite sides of the storage chamber means for decelerating the reel to rest whenever the tape loop lies between the short and long loop positions and the tape is moving in opposite directions on the opposite sides of the storage chamber.

6. A servosystem in accordance with claim 5, wherein the reel is driven by a motor, the means for driving the reel in a first direction includes means for providing a signal having a first polarity to the motor, the means for driving the reel in a second direction includes means for providing a signal having a second polarity opposite the first polarity to the motor, and the means for decelerating the reel to rest includes means for providing a signal having the first polarity to the motor whenever the tape loop lies between the short and long loop positions, the tape is moving in opposite directions on the opposite sides of the storage chamber means, and the reel is moving in the second direction, and means for providing a signal having the second polarity to the motor whenever the tape loop lies between the short and long loop positions, the tape is moving in opposite directions on the opposite sides of the storage chamber means, and the reel is moving in the first direction.

7. A servosystem in accordance with claim 6, wherein the means included within the reel-decelerating means for providing signals having the first and second polarity together comprise first logic means responsive to the means for driving the reel in a first direction and the means for driving the reel in a second direction for providing a first output indication whenever the signals provided by the means for driving the reel in first and second directions are both of zero value, second logic means for providing a second output indication whenever the tape is moving in opposite directions on the opposite sides of the storage chamber means and the reel is moving in the first direction, third logic means for providing a third output indication whenever the tape is moving in opposite directions on the opposite sides of the storage chamber means and the reel is moving in the second direction, fourth logic means for providing the signal having the second polarity to the motor whenever the first and second output indications are both present, and fifth logic means for providing the signal having the first polarity to the motor whenever the first and third output indications are both present.

8. A servosystem in accordance with claim 6, wherein the first-mentioned means for providing a signal having a first polarity to the motor includes a first sensor mounted within the storage chamber means so as to extend from the short loop position along a small portion of the distance between the short loop position and the first end of the storage chamber means, and operative to generate a signal having the first polarity in response to the tape loop, said signal having a maximum value when the tape loop is positioned between the first sensor and the first end of the storage chamber means and decreasing linearly with movement of the tape loop along the first sensor to zero value at the short loop position, and wherein the first-mentioned means for providing a signal having a second polarity to the motor includes a second sensor mounted within the storage chamber means so as to extend from the long loop position along a small portion of the distance between the long loop position and the second end of the storage chamber means, and operative to generate a signal having the second polarity in response to the tape loop, said signal having a maximum value when the tape loop is positioned between the second sensor and the second end of the storage chamber means and decreasing linearly with movement of the tape loop along the second sensor to zero value at the long loop position.

9. A reel servosystem for a tape extending between a capstan and a reel, the reel being driven by a reel motor, comprising:

- a tape storage vacuum chamber, the chamber receiving a portion of the tape between the capstan and the reel to form a tape loop;
- first and second spaced-apart loop length sensors disposed at long and short loop positions respectively along the vacuum chamber and each being responsive to location of the tape loop in the vicinity thereof to generate a signal varying with tape loop position;
- means responsive to the capstan for providing a signal representative of the velocity of the capstan;
- means responsive to the reel motor for providing a signal representative of the velocity of the reel motor;
- logic network means responsive to the signals from the first and second loop length sensors, the capstan velocity signal, and the reel motor velocity signal for providing forward and reverse drive signals; and
- summing junction means coupled to receive the signals from the first and second loop length sensors and the forward and reverse drive signals for providing a servo error control signal to drive the reel motor.

10. A reel servosystem in accordance with claim 9, further including operational amplifier means coupled to each of the first and second loop length sensors for amplifying the signals generated thereby.

11. A reel servosystem in accordance with claim 9, wherein the servo error control signal comprises the signal from the first loop length sensor when the tape loop is at least long enough to be located adjacent the first loop length sensor, the servo error control signal comprises the signal from the second loop length sensor when the tape loop is at least short enough to be located adjacent the second loop length sensor, and the servo error control signal comprises the forward and reverse drive signals from the logic network means when the tape loop is located between the first and second loop length sensors.

12. A reel servosystem in accordance with claim 9, wherein the reel motor velocity signal comprises the back electromotive force of the reel motor.

13. A reel servosystem in accordance with claim 9, wherein each of the signals generated by the first and second loop length sensors varies in direct relation to the location of the tape loop along the length of the sensor.

14. A reel servosystem in accordance with claim 9, wherein the first and second loop length sensors are photoelectric linear sensors.

15. A digital magnetic tape transport comprising:

- supply and takeup reels, each having a drive motor coupled thereto;
- a magnetic tape extending between the supply and takeup reels;
- tape-driving means engaging a portion of the tape extending between the supply and takeup reels and responsive to external command signals to bidirectionally drive the tape;
- transducing means position adjacent a portion of the tape extending between the supply and takeup reels;
- first and second vacuum chambers, the first vacuum chamber being positioned to receive and form a loop in a portion of the tape extending between the tape-driving means and the takeup reel and the second vacuum chamber being positioned to receive and form a loop in a portion of the tape extending between the tape-driving means and the takeup reel; and
- separate reel servo means associated with each of the first and second vacuum chambers, each of the reel servo means including means defining spaced-apart long and short loop positions within the associated vacuum chamber, means responsive to the positioning of the tape loop on the opposite side of the long loop position from the short loop position for energizing the drive motor of the associated reel to drive the reel in a direction in which tape from the reel is fed into the vacuum chamber, means responsive to the positioning of the tape loop on the opposite side of the short loop position from the long loop position for energizing the drive motor of the associated reel to drive the reel in a direction in which tape is drawn out of the vacuum chambers and onto the reel, and means responsive to the direction of movement of the associated reel, to the direction in which the tape-driving means is driving the tape and to the positioning of the tape loop between the short and long loop positions for energizing the drive motor to decelerate the reel to rest if the reel is moving in a direction in which tape from the reel is fed into the vacuum chambers and the tape-driving means is driving the tape in a direction to feed tape into the vacuum chamber, or if the reel is moving in a direction in which the tape is drawn out of the vacuum chamber and onto the reel and the tape-driving means is driving the tape in a direction to draw tape out of the vacuum chamber.

* * * * *